United States Patent [19]

Fox et al.

[11] Patent Number: 4,906,165
[45] Date of Patent: Mar. 6, 1990

[54] FLOW METER FOR A POSITIVE DISPLACEMENT PUMP

[76] Inventors: Ronald L. Fox, P.O. Box 234, Sandia Park, N. Mex. 87047; Scott A. Amundsen, 7316 Carriage Rd. NE., Albuquerque, N. Mex. 87109

[21] Appl. No.: 242,700

[22] Filed: Sep. 9, 1988

[51] Int. Cl.⁴ .................................... F04B 49/00
[52] U.S. Cl. .............................. 417/12; 417/40; 417/44; 137/391
[58] Field of Search .......... 417/12, 36, 40, 44; 137/391

[56] References Cited

U.S. PATENT DOCUMENTS

| | | | |
|---|---|---|---|
| 2,405,479 | 8/1946 | Whitlock | 210/93 |
| 2,882,724 | 4/1959 | Smith | 137/391 |
| 3,189,036 | 6/1965 | Hebard | 137/391 |
| 4,186,419 | 1/1980 | Sims | 417/40 |

FOREIGN PATENT DOCUMENTS

632678 12/1961 Canada .................. 137/391

*Primary Examiner*—Donald E. Stout
*Assistant Examiner*—D. Scheuermann
*Attorney, Agent, or Firm*—Francis J. Lidds

[57] ABSTRACT

A flow meter for use with a fluid source includes a chamber of known volume, and level sensors for detecting fluid boundaries at either end of the known volume. A valve between the fluid source and chamber is opened at a defined time until fluid level within the chamber rises above the upper sensor, whereupon the valve is closed. As the fluid level falls past the upper sensor a second time level is measured, with both time intervals being terminated as the level falls to the lower level sensor. The average flow rate as the fluid falls between the two sensors is calculated by a computer, and the total volume is then calculated using the longer measured time interval. Flow rates over long time periods can be accurately measured.

15 Claims, 5 Drawing Sheets

FLOW METER FOR A POSITIVE DISPLACEMENT PUMP

BACKGROUND OF THE INVENTION

1. Field of the Invention

The present invention pertains to flow meters, and in particular to flow meters for use with positive displacement pumps.

2. Description of the Related Art

Positive displacement pumps are currently being used in a variety of industrial and other applications. For example, U.S. Pat. No. 4,160,626 discloses a positive displacement pump of a type useful for water flooding of oil wells so as to augment the recovery of oil from producing well. Such pumps may be operated by high pressure air, natural gas or other fluid pumping media.

Frequently, it is desirable in pumping operations to introduce one or more chemical additives into the fluid being pumped. Such additives may, for example, comprise a viscosity enhancer useful for improving the pumping efficiency. Other additives may, for example, reduce foaming of the fluid being pumped. Frequently, the use of such chemical additives is important to maintain the regular operation of a producing well, and to reduce costly downtime. Many of these chemical additives are quite expensive, and considerable cost savings can be realized if overuse of the chemicals is eliminated. An accurate and reliable metering is needed to insure that the proper amount of chemical additives are injected, necessary to achieve the desire objective and to eliminate the usage of additional amounts of these chemicals beyond the necessary amounts.

In the field of oil production, and in many other commercial fields of interest today, it is desirable to meter relatively small quantities of chemical additives, continuously, over a relatively long period of time. Experience with low flow, high pressure injection systems, in particular, has indicated the need for improved flow meters.

With regard to flow metering in general, a variety of flow meter devices have been proposed. For example, a manual sight glass method employs a sight glass between a source of fluid to be pumped, upstream of a pump which directs that fluid to its desired destination. A valve is provided between the source of fluid and the sight glass. In operation, the pump is energized and the valve is open so as to allow fluid to fill the sight glass. The sight glass is provided with two markings, one above the other and the valve is closed when the level in the sight glass approaches the upper marking. The time and sight glass level are recorded and level in the sight glass is allowed to drop to the lower mark, when the time and level are again recorded. An average flow rate is calculated by dividing the difference in volume in the sight glass between the two markings, and the time required for the fluid to drop from the higher mark to the lower mark in the sight glass.

SUMMARY OF THE INVENTION

It is an object of the present invention to provide a flow meter for use with a positive displacement pump.

Another object of the present invention is to provide a flow meter which can deliver a relatively low flow rate to a variety of low pressure and high pressure equipment, including high pressure injection pumps.

Another object of the present invention is to provide flow meters of the above-described type for use with pumps in which the flow rate is controlled through timing of the fluid inlet as opposed to controlling the pump stroke or the pump outlet pressure, for example.

These and other objects according to the present invention, which will become apparent from studying the appended description in conjunction with the drawings, is provided in an apparatus for injecting relatively small metered quantities of fluid over relatively long periods of time, comprising:

a fluid source;

a chamber defining a preselected volume between upper and lower fluid levels associated therewith;

a first sensor for sensing the presence of a fluid boundary of a fluid column at the lower level in the chamber and for sending a signal indicative thereof;

a second sensor for sensing the presence of a fluid boundary at the upper level in the chamber and for sending a signal indicative thereof;

discharge means downstream of the chamber having an outlet and an inlet coupled to the chamber and to the fluid source;

remotely actuable valve means upstream of the chamber, between the fluid source and the chamber, the valve means having an outlet and an inlet coupled to the fluid source and further including means for opening and closing the valve in response to signals received from a computer control means;

fluid coupling means coupling the chamber and the discharge means to the valve outlet;

computer control means coupled to the first and the second sensors and the valve means, for receiving a signal from the first sensor indicating the presence of a fluid boundary at the lower level in the chamber and for sending an opening signal to the valve means in response thereto so as to initiate filling of the chamber above the lower level;

operating cycle timer means responsive to the opening signal and the first sensor signal for measuring an operating time interval beginning at the opening of the valve and ending upon an ending signal from the first sensor responding to a fall of fluid level in the chamber, and the operating cycle timer means including means for sending a signal corresponding to the operating time interval to the computer control means;

the computer control means including means responsive to the second sensor signal indicating the presence of a fluid boundary at the upper level in the chamber so as to issue a closing command to the valve, whereupon fluid in the chamber is evacuated, flowing to the discharge means;

evacuation timer means responsive to the first and the second sensor signals for measuring a time interval for evacuating the chamber during which the fluid level in the chamber falls from the upper level to the lower level and the evacuation timer means further including means for sending a signal corresponding to the evacuation time interval; and the computer control means including first input means for inputting the preselected volume of the chamber, second input means coupled to the operating cycle timer means for receiving a signal corresponding to the operating cycle time interval, third input means coupled to the evacuation timer means for receiving a signal corresponding to evacuation time interval, means for calculating a flow rate from the preselected volume of the chamber and the evacuation time interval and means for calculating the total volume of the fluid inputted to the pump from the calculated flow rate and the operating cycle time interval.

The apparatus is particularly advantageous when used with positive displacement pump discharge means.

BRIEF DESCRIPTION OF THE DRAWINGS

In the drawings, wherein like elements are referenced alike.

DETAILED DESCRIPTION OF THE PREFERRED EMBODIMENT

Figure 1:
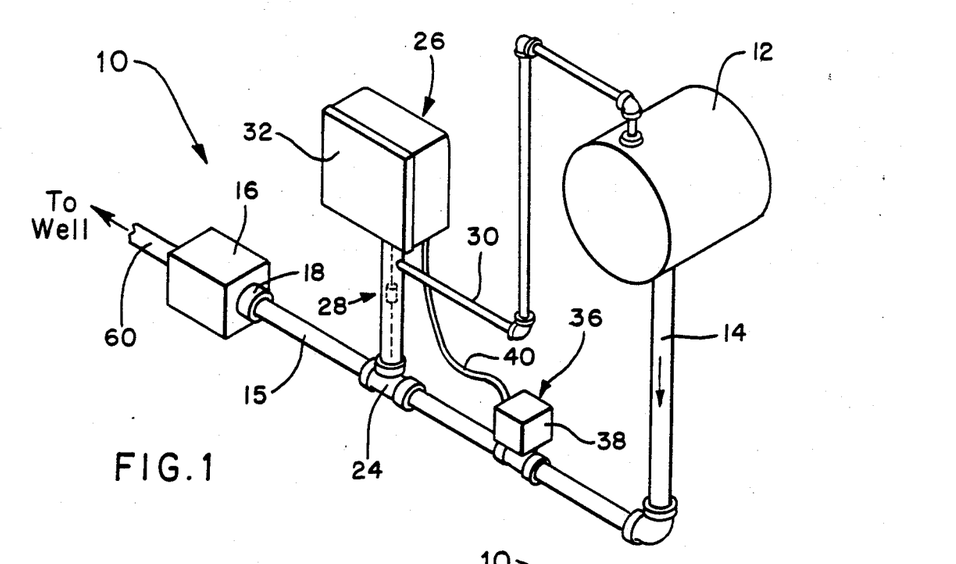
FIG. 1 is a perspective view of a pumping system including a flow meter according to principles of the present invention.

Referring now to the drawings, and initially to FIG. 1, a pumping system is generally indicated at 10. The system includes a fluid source 12 coupled by a conduit 14 to a pump 16. Pump 16 includes an inlet 18 connected to conduit 14 and an outlet 20 (see FIG. 2). Pump 16 is a reciprocating positive displacement pump described in commonly assigned U.S. Pat. No. 4,160,626, which is herein incorporated by reference.

A T-junction 24 is disposed in conduit 14 and provides a tap for fluid connection to a flow meter generally indicated at 26. Flow meter 26 includes a vertical, generally tubular float chamber 28 connected at one end to T-junction 24 and having a vent line 30 at its upper end. A control cabinet 66 is disposed atop float chamber 28. As will be explained in greater detail herein, control cabinet 66 includes a computer having controllable timing and switching functions to meter the flow rate and total volume of fluid inputted to pump 16 along conduit 15.

Also shown in FIG. 1 is a solenoid valve 36 disposed in conduit 14 upstream of the flow meter and pump so as to make and break fluid flow connection thereto. With solenoid valve 36 in a closed position, fluid source 12 is isolated from equipment downstream of the valve. With the valve in an open position, fluid from source 12 travels along conduit 14 in a flow which is split at T-junction 24 into a first path via conduit 15 directed to pump 16 and a second path via float chamber 28 directed toward flow meter 26. A solenoid control unit 38 is mounted atop valve 36 and provides remote actuation of the valve in response to signals transmitted along a control cable 40, which interconnects the flow meter to the solenoid actuator of the valve.

Figure 2:
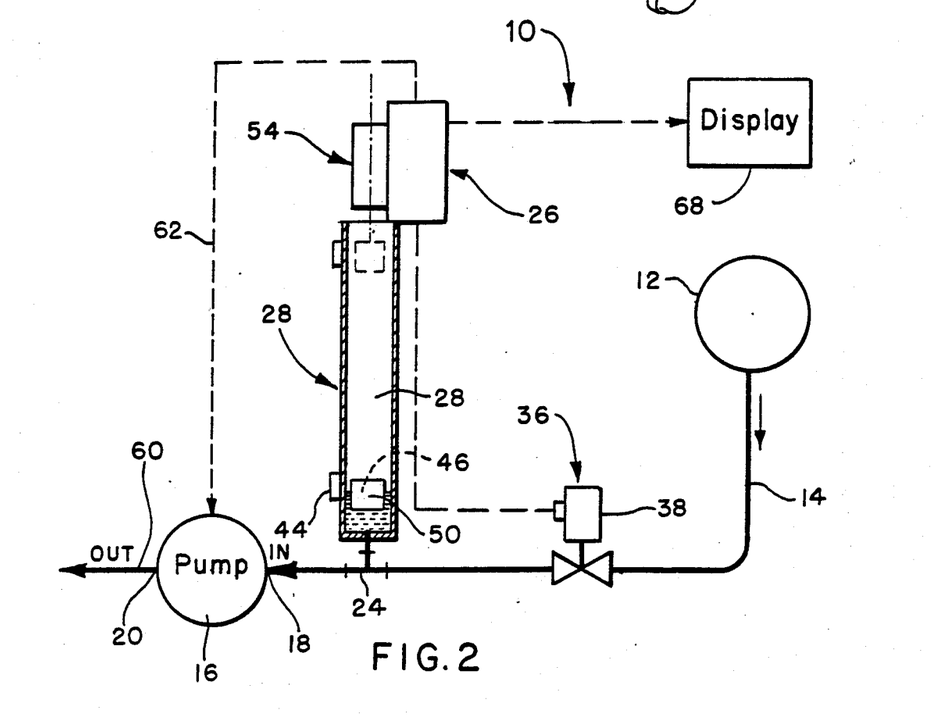
FIG. 2 is a schematic diagram of the system of FIG. 1.

FIG. 2 is a schematic diagram of the pumping system 10. The float chamber 28 is shown therein being partially filled with a fluid 44 having an upper fluid boundary 46. A float 50 rides on the fluid column 44, at the fluid boundary 46 thereon. The float 50 is also illustrated in phantom at a raised position adjacent the top of float chamber 28.

The numeral 54 generally indicated a computer having multiple timing functions or timing a number of different operating intervals, along with calculation means for calculating flow rate, total volume, and further has valve and pump controls, temperature compensation and other functions. The computer of the preferred embodiment preferably comprises an Hitachi MCU/MPU device of the HD6305 microcomputer family.

As will be explained in greater detail herein, the preferred embodiment of the flow meter is incorporated in a pumping system, although it will become apparent to those skilled in the art that the flowmeter can also be used with other equipment, including low pressure and even gravity-fed fluid distribution systems. Referring again to the pumping system 10, when pump 16 is activated, fluid fed to its input 18 is directed to a discharge conduit 60 which, for example, may comprise a downhole of a well.

Briefly, in general terms, valve 36 is opened for a measured time interval to initiate flow meter operation. Over a first portion of the interval, flow along conduit 14 is split in a first flow path filling float chamber 28, and in a second flow path directed toward pump inlet 18. The first portion of the time interval continues until the float chamber is filled to an upper operating level. Thereafter, in the second portion of the time interval, solenoid valve 36 is closed, stopping flow from the valve output to the pump inlet. However, the float chamber 28 is filled with fluid which is allowed to drain into or otherwise be evacuated into the downstream discharge means. Since the discharge means herein comprises a positive displacement pump, and since conduit 14 is closed by valve 36, the fluid in chamber 28 is sucked through conduit 15 into pump inlet 18, with a negative pressure induced by pump action. Over a second portion of the time interval, the fluid level is allowed to fall in float chamber 28 for a measured period Of time over which a known volume reduction in float chamber 28 occurs. After the volume reduction, the time interval is terminated, preferably by de-energizing pump 16 via control signals carried along a control line 62, leading from computer 54 to the pump.

Given the known volume reduction, and the measured time interval over which the volume reduction occurs, the flow rate through pump 16 for the second portion of the overall time interval, is accurately estimated, assuming a constant flow rate, and the first portion of the time interval is used to calculate the total volume discharged by pump 16 throughout the entire operating cycle. According to one aspect of the present invention, a surprisingly accurate match between the flow rates of the first and second portions of the time interval was experienced. The accurate match was also verified with mathematical error analysis which showed an unexpected overall accuracy in the fluid metering system.

Figure 3:
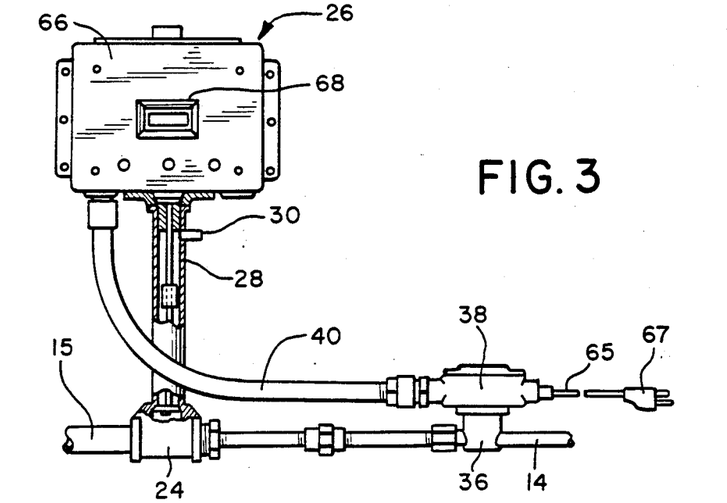
FIG. 3 is a front elevational view of the flow meter and valve components of the system of the preceding FIGURES.
Figure 4:
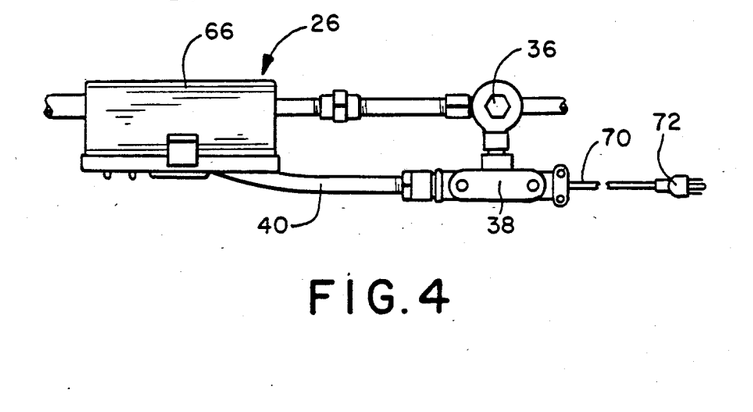
FIG. 4 is a top plan view of the flow meter and valve of FIG. 3.

Referring now to FIG. 3, flow meter 26 includes a cabinet 66 in which the computer and control circuitry associated therewith are stored. The computer 54 includes a display 68 indicating various operating conditions and parameters. A selector switch 94, causes the display 68 to read either the total volume discharged by pump 16 since the beginning of an operating period, or can be switched to display the total elapsed time of the operating period. In addition, cabinet 66 includes an indicator light for indicating a reset or an erroneous operating condition. For example, float chamber 28 is expected to fill within a known predetermined time after opening valve 36. If the switches 80, 82 do not detect the presence of a fluid in float chamber 28, within that known time, an indicator light is illuminated, informing an operator that system maintenance is required. For example, the fluid source 12 may have become depleted during the operating period. The display 68 normally displays the current flow rate, with switch 94 providing optional readouts of total volume pumped since powerup of the flow meter system, and total elapsed time since powerup of the flow meter system. The reset button 92 restarts the computer 54 and its associated control circuitry to begin another flow meter operating period, with total volume and elapsed time being reset to zero. Lamp 94 is illuminated if the flow rate is two low or if a malfunction is sensed by the computer. Valve 36, as mentioned above, has a solenoid actuator 38 connected to the computer by a control cable 40. Electrical power for operating the solenoid 38 is provided by a supply line 65, having a plug 67 for conventional connection to an electrical source, not shown.

Figures 5, 6, 7, 8:
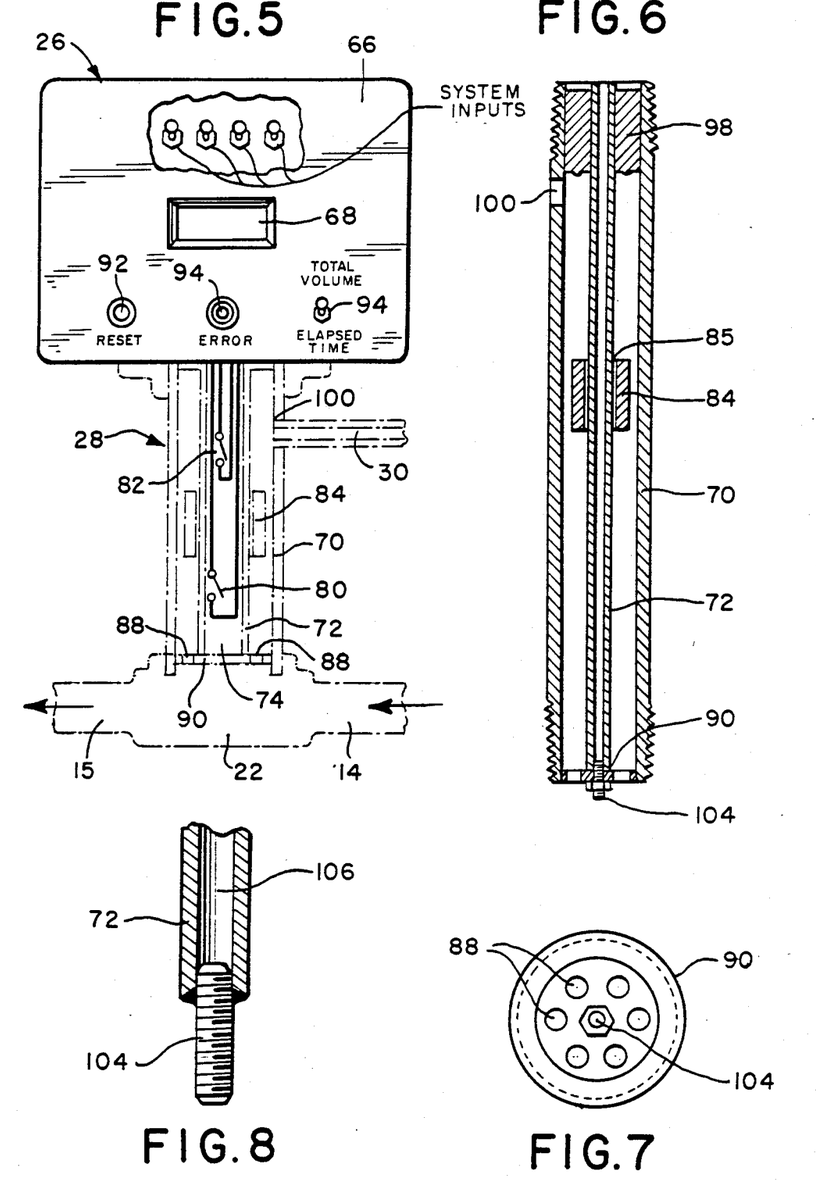
FIG. 5 is an enlarged, partly schematic elevational view of the flow meter of FIG. 3.
FIG. 6 is an enlarged fragmentary view of FIG. 3 showing the vertical body portion thereof, taken in cross-section.
FIG. 7 is an end view of the column of FIG. 6.
FIG. 8 is a fragmentary view of the lower central portion of FIG. 6, shown on an enlarged scale.

Referring additionally to FIG. 5, the float float chamber 28 of flow meter 26 includes a generally cylindrical housing 70, which is terminated at its lower end to T-junction 24, in flow communication with conduit 14, and the conduit 15 connecting the T-junction to the inlet 18 of pump 16. Disposed within housing 70 is an internal tubular instrument housing 72 having an interior 74 which preferably is maintained in a dry condition, separated from the fluid flowing through the pumping system. Disposed within interior of housing 72 are lower and upper switches 80, 82, which preferably are of the magnetically actuable type.

A float 84 rides on the upper boundary of the fluid column disposed within housing 70. The fluid column rise within the float chamber through a series of apertures 88 formed in a lower disk-like support plate 90, as will be explained with reference to FIG. 7. Float 84 preferably carries a magnetic field which operates switches 80, 82, when disposed immediately adjacent thereto. The switches 80, 82 are schematically illustrated in FIG. 5 in a much larger scale than the surrounding components. However, FIG. 5 is useful for explaining the operation of the flow meter, as will be seen shortly.

Referring now to FIGS. 6-8, float chamber 28 will be described in greater detail. Float chamber 28 preferably comprises a float housing made from a conventional metallic pipe which comprises the aforementioned tubular housing 70. The upper and lower ends of the pipe are threaded, the lower end for connection to the T-junction 24 and the upper end for connection to cabinet 66. A bushing 98 is welded at the upper end of housing 70 to prevent the intrusion of fluid into cabinet 66 and the electronics stored therein. A threaded outlet port is provided at 100 for vent line 30.

The float 84 is preferably cylindrical in configuration having an inner bore 85 for sliding along the inner tublike housing 72. The lower end of tubular housing 70 is enclosed by baffle disk 90 having a series of accurately dimensioned apertures 88 permitting flow into and out of float chamber 28. Referring additionally to FIG. 8, the inner tubular housing 72 is enclosed at its lower end by a threaded rod 104 to maintain the interior of the housing in a dry condition. The threaded rod 104 provides convenient mounting of baffle disk 90, as illustrated in FIGS. 6 and 7, wherein the threaded rod 104 is received in a central aperture in the disk-like baffle plate 90. The baffle disk 90 may be readily removed from the flow meter apparatus, permitting a ready exchange of the baffle plate for a plate having a different number or size apertures, thus providing different calibrations for the flow meter as required.

The float 84 and the switches 80,82 disposed within interior tubular housing 72 cooperate, as described above, for switch operation as the float travels therepast, in response to a changing fluid level within float chamber 28. In the preferred embodiment, the float is of the magnetic type, and is commercially available as a vertically mounted TELLEVEL Model No. 505 available from the Revere Corporation of America. The switches 80,82 may comprise, for example, magnetically operated reed switches. The switches 80,82 are spaced apart, being positioned at selected locations within the inner tubular housing 72. As indicated schematically in FIG. 5, it is generally preferred that the switches 80,84 be spaced inwardly of the operating end points of column 28. That is, it is preferred that the lower switch 80 be positioned above baffle disk 90, and the upper switch 82 be positioned slightly below the outlet 100 for vent line 30. This construction allows the preferred operating conditions wherein the fluid level can rise above the upper switch 82.

According to one aspect of the present invention, the switches 80,82 are positioned such that corresponding fluid levels of a fluid column disposed within cylindrical housing 70 are spaced a known distance apart so as to define an accurately determined volume therebetween. The switches 80,82 are located exactly at the two defined fluid levels to provide accurate timing of the fall of a fluid column from the upper level at switch 82, to the lower level at switch 80. It is generally preferred that switch 80 be located above baffle disk 90 so that, when the fluid column drops to the lower switch 80, control circuitry associated with the switch can discontinue pump operation, leaving an amount of fluid in float chamber 28 prior to initiation of a consecutive operating cycle. This feature, along with other features shown and described herein, contribute to a heretofore unavailable convenient and rapid flow measurement having an improved, low error rate.

Figure 9A:
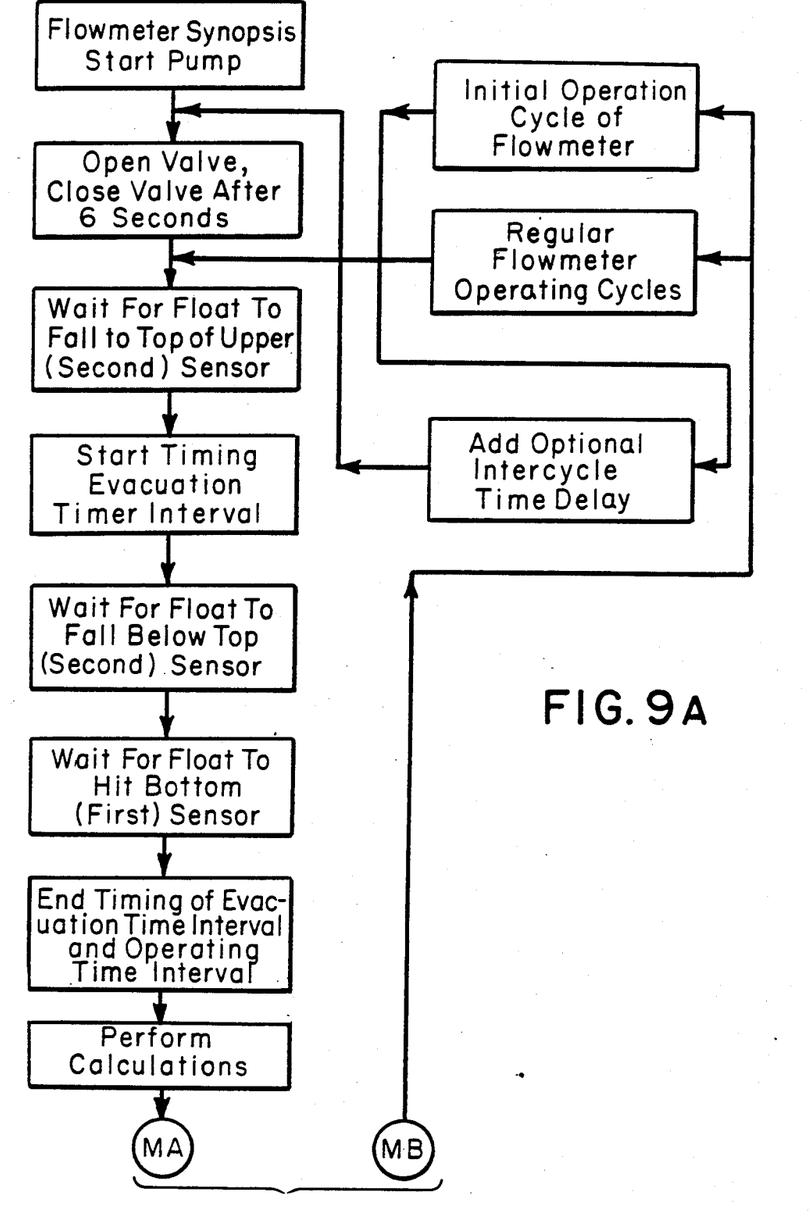
FIGS. 9a and 9b, taken together, comprise a flow diagram illustrating operation of a flow meter according to principles of the present invention.
Figure 9B:
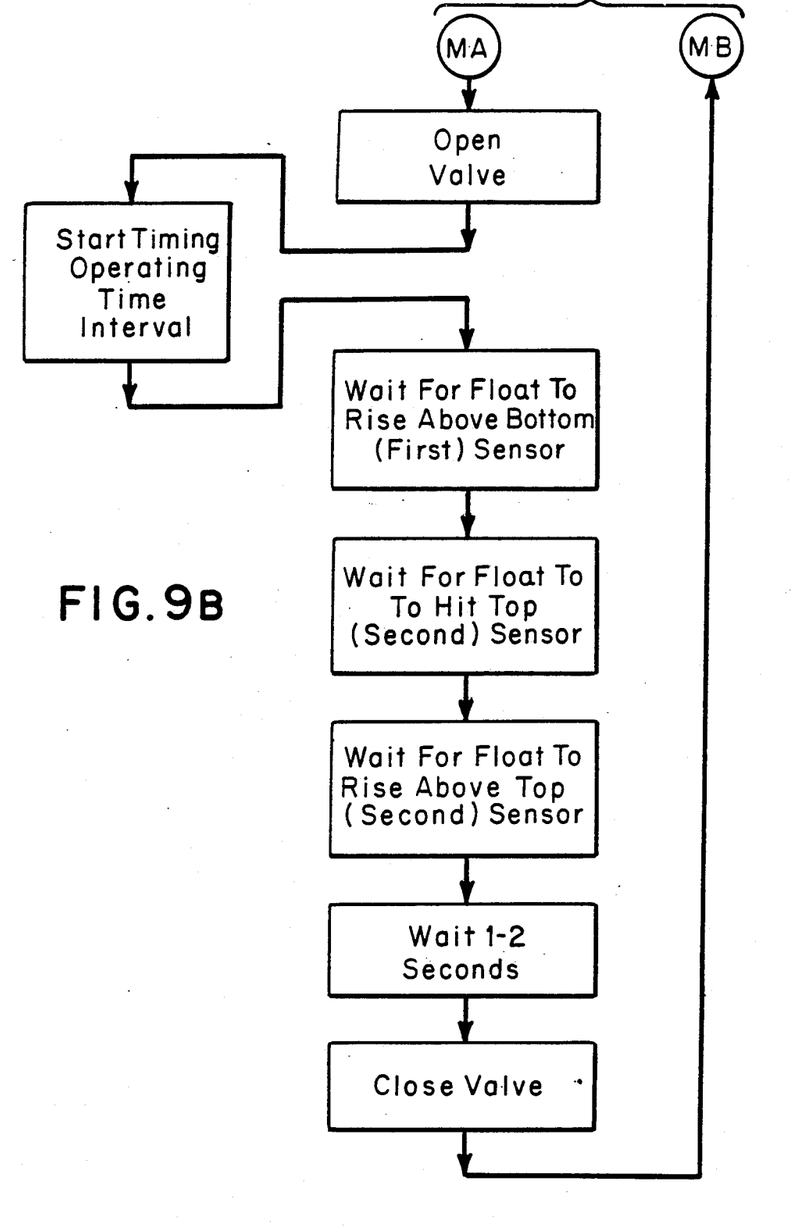

With reference to FIGS. 9a,9b an initial cycle of operation is begun with fluid source 12 installed, and the valve 36 opened to filling that portion of conduit 14 coupling the fluid source 12 to the solenoid valve 36. The computer 54 initiates the first cycle of operation by sending an opening signal along cable 40 to the solenoid actuator 38, opening valve 36 and allowing the remaining portion of conduit 14, float chamber 28, and conduit 15 to become filled with fluid 44. As mentioned above, flow continues along conduit 14, being split at T-junction 24, with a first portion of the fluid flow being discharged by pump 16, and a second portion of the fluid flow filling float chamber 28.

As fluid enters float chamber 28, it reaches the lower level defining the bottom boundary of the preselected volume, tripping switching 80. As indicated schematically in FIG. 5, switch 80, (and switch 82, also) is connected through electrical conductors to the computer 54 within housing 66. No control action is taken with the first operation of switch 80. Fluid continues to enter float chamber 28 raising float 84 above the lower control level. Float 84 is raised to a point adjacent switch 82 and when the fluid level reaches the upper level setting, that level defining the upper boundary of the preselected measured volume, switch 82 is tripped. Again, the control action is taken with the first operation of switch 82. If desired, computer 54 can be programmed so as to acknowledge the initial tripping of switches 80,82 to indicate a satisfactory precursor to the first metering event.

According to one aspect of the present invention, the fluid is allowed to rise within float chamber 28, above the upper level of the measured volume within the float chamber. This amount of "overshoot" above the upper level of switch 82 is not critical, for reasons which will be made clear herein. In the preferred embodiment, the amount of "overshoot" within float chamber 28 is defined by a time delay stored within computer 54 and initiated when the upper switch 82 is tripped. After expiration of the "overshoot" time delay, computer 54 sends a closing signal to solenoid 38 along cable 40, instructing valve 36 to close. As mentioned above, a portion of the fluid flow in conduit 14 is discharged directly to pump 16 and, for the time being, passes through the pumping system without direct measurement thereof. With the closing of solenoid 36, this flow is terminated.

It is generally preferred that the fluid source 12 have a positive pressure head to maintain a steady, but as yet unmetered, flow rate through conduits 14,15 and float chamber 28. In the preferred embodiment, the fluid source 12 provided sixteen inches of head to the solenoid valve 24. With valve 36 in a closed position flow is continued through pump 16 as the column of fluid within float chamber 28 is allowed to fall. The column falls from its initial maximum undefined height with float 84 falling past upper switch 82 which is tripped as the fluid column reaches the defined upper boundary of the measured volume within float chamber 28. This latter operation of switch 82 initiates an evacuation time interval measurement within computer 54. The fluid within float chamber 28 continues to fall, until float 84 initiates tripping of the lower switch 80. The later operation of switch 80 initiates a number of different responses in the control system. For example, the first, overall time interval (operating interval) begun when valve 36 is initially opened, is terminated. Next, the shorter time interval (the evacuation time interval) begun when the fluid column falls past the upper level associated with switch 82, is also terminated. Third, it is generally preferred that pump 16 be deenergized to prevent further falling of the fluid column with float chamber 28. Finally, an inter-cycle time delay is initiated, the purpose of which will be described herein shortly.

The data collected by computer 54 during the operating cycle is as follows. As mentioned above, the volume within float chamber 28, between the levels associated with upper switch 82 and lower switch 80 is accurately measured. This quantity is input into the memory of computer 54. As the fluid column falls in float chamber 28, the interval of its falling between upper switch 82 and lower switch 80 is accurately timed by operation of those switches. Computer 54 divides the known measured evacuation volume by the measured time interval to discharge the volume and calculates an average flow rate present in the float chamber as the fluid column falls between the levels associated with switches 80,82.

According to other aspects of the present invention, the pumping system and in particular the flow meter apparatus are constructed such that the flow rate through pump 16 is maintained constant, regardless of whether the flow thereto comes from fluid source 12, or the falling fluid column within float chamber 28.

The overall pumping cycle (operating cycle) is accurately measured by computer 54, beginning at the point in time when valve 36 is opened, and ending when the fluid column falls to the level associated with lower switch 80, tripping that switch. As mentioned, at the point in time when switch 80 is tripped at the end of a pumping cycle, pump 16 is deactivated to prevent any unmeasured loss of fluid in the pumping system. Since the flow rate through pump 16 is held constant at all times, the average flow rate calculated by the falling fluid column within float chamber 28 can be readily applied to the overall pumping cycle and thus the total volume passing through pump 16, from the time valve 36 is initially opened, until the time that the falling column trips switch 80, can be very accurately determined.

The flow meter according to the present invention finds particular application with relatively low pumping rates occurring over relatively long or extended time intervals. As mentioned above, it is frequently desirable in pumping, and other commercial applications that a slow steady discharge be maintained throughout a prolonged work period. In particular, a flow meter instructed according to principles of the present invention is found to provide very accurate metering over flow rates ranging from one or more pints per day to twenty gallons per hour or more. The accuracy of the flow meter has been found to be consistently below 5%.

It is generally preferred in the commercial embodiment of the present invention that a third float-activated switch be installed between the first and second switches so as to define a smaller, but accurately measured float chamber volume. An operator can select among two different upper limit switches with electrical controls installed within cabinet 66. In the preferred embodiment, the pipe for tubular housing 70 had diameters ranging between one and three inches. The first upper limit switch was placed approximately one inch above the lower limit switch, while the second upper limit switch was placed six inches above the lower limit switch.

The preferred embodiment according to the present invention also includes temperature measuring devices within conduit 14 of the type providing a digital temperature signal to computer 54. The preferred temperature range of operation is between 32 and approximately 160° F. Computer 54 was programmed for conventional temperature compensation calculations based upon a known reference temperature at which the pumping system is initially calibrated, when the switches within float chamber 28 are spaced apart to attain a well defined, accurately measured test volume.

Upon subsequent operations of the flow meter, an opening signal is sent to valve 36, raising the fluid level in float chamber 28 from the lower level associated with switch 80, to a point above the upper level associated with switch 82, the operation of switch 82 associated with an upwardly rising column initiating the overshoot time delay referred to above, typically on the order of one or two seconds. At the end of the overshoot time delay, a closing signal is sent to solenoid 36 whereupon all fluid flowing through pump 16 is associated with the falling fluid column within float chamber 28. As before, the time interval required for the fluid column to fall between switches 80,82 is accurately measured to determine the average flow rate over that period. When bottom switch 80 is tripped by a falling fluid column, the timing cycle is terminated, pump 16 is deactivated and any optional inter-cycle time delay is initiated. Computer 54 calculates the average flow rate during falling of the fluid column between switches 80,82 and applies flow rate to the overall time period begun when valve 36 is opened and ending when switch 80 is tripped by a falling fluid column.

As mentioned above, optional an inter-cycle time delay may be provided. This time delay is useful for very low flow rates. Although the fluid of source 12 will not be continuously fed to pump 16, fluid pulses corresponding to the total volume passed during the above-described metering operation can be spaced throughout an operating period by simply spacing apart the metering operations with a known inter-cycle time delay. For example, assuming that a metering event as described above allows the passage of a total volume of one pint, and the metering event occurs over one minute, the inter-cycle time delay can be set at fifty-nine minutes to provide an effective, average flow rate of one pint per hour. In practice, if extremely low flow rates are of principal concern, the size of conduit 14, float chamber 28 and conduit 15 can be reduced for smaller total volume quantities associated with a metering event, permitting the inter-cycle time delay to be significantly reduced, to thereby approximate a more nearly continuous dispensing of injected fluid into discharge conduit 60.

In summary, it will now be appreciated that the flow meter is connected to a positive head of fluid in order to charge and recharge the volume float chamber 28. The volume float chamber is also connected to the suction side of a discharge device, such as pump 16. A metering cycle starts with the volume float chamber being opened to the liquid source, with solenoid 36 being actuated by an opening signal sent to it from the control computer 54. Assuming an operation subsequent to initial start-up, the opening signal to the valve can be sent in response to the float falling to the lower position, tripping switch 80. That is, an inter-cycle time delay is not required for flow meter operation. As the volume float chamber 28 fills, the float 84 rises until a second signal is received in computer 54, upon operation of switch 82. The valve can either be closed upon the occurrence of this signal, or it can continue during an overshoot time delay. Assuming the solenoid valve is closed when switch 82 is activated, the pump is caused to draw fluid from the float chamber 28, only. The time required to partially evacuate the proctological volume of float chamber 28 is measured by the timing circuit within computer 54. The partial evacuation time and the proctological volume are converted into a flow rate which is displayed by display 68. At this point in time, the low fluid level signal from switch 80 again opens the solenoid valve 36 and the flow meter cycle repeats.

Use of a magnetic float and magnetic sensors allows float chamber 28 to be effectively shortened—an important feature where a customer's space allocations for the flow meter are limited. However, other level sensing instrumentation can be employed. For example, an optical system may be installed wherein the float breaks a light path passing through float chamber 28 at carefully defined levels. As another example, if the fluid being metered is electrically conductive, electrodes can be placed along float chamber 28, and resistance measuring a circuitry can indicate the passage of a fluid boundary past the electrodes.

Obviously, any modifications and variations of the present invention are possible in light of the above teachings. Thus, it is to be understood that, within the scope of the appended claims, the invention may be practiced otherwise than as specifically described above.

What is claimed is:

1. Apparatus for injecting relatively small metered quantities of fluid over relatively long periods of time, comprising:

a fluid source;

a chamber defining a preselected volume between upper and lower fluid levels associated therewith;

a first sensor for sensing the presence of a fluid boundary of a fluid column at the lower level in said chamber and for sending a signal indicative thereof;

a second sensor for sensing the presence of a fluid boundary at the upper level in said chamber and for sending a signal indicative thereof;

discharge means downstream of said chamber having an outlet and an inlet coupled to said chamber and to said fluid source;

remotely actuable valve means upstream of said chamber, between said fluid source and said chamber, said valve means having an outlet and an inlet coupled to the fluid source and further including means for opening and closing the valve in response to signals received from a computer control means;

fluid coupling means coupling the chamber and the discharge means to the valve outlet;

computer control means coupled to said first and said second sensors and said valve means, for receiving a signal from said first sensor indicating the presence of a fluid boundary at the lower level in said chamber and for sending an opening signal to said valve means in response thereto so as to initiate filling of said chamber above said lower level;

operating cycle timer means responsive to said opening signal and said first sensor signal for measuring an operating time interval beginning at the opening of said valve and ending upon an ending signal from said first sensor responding to a fall of fluid level in said chamber, and said operating cycle timer means including means for sending a signal corresponding to the operating time interval to said computer control means;

said computer control means including means responsive to said second sensor signal indicating the presence of a fluid boundary at the upper level in said chamber so as to issue a closing command to the valve, whereupon fluid in said chamber is evacuated, flowing to said discharge means;

evacuation timer means responsive to said first and said second sensor signals for measuring a time interval for evacuating said chamber during which the fluid level in said chamber falls from said upper level to said lower level and said evacuation timer means further including means for sending a signal corresponding to the evacuation time interval; and said computer control means including first input means for inputting the preselected volume of the chamber, second input means coupled to the operating cycle timer means for receiving a signal corresponding to the operating cycle time interval, third input means coupled to the evacuation timer means for receiving a signal corresponding to evacuation time interval, means for calculating a flow rate from the preselected volume of the chamber and the evacuation time interval and means for calculating the total volume of the fluid inputted to said pump from the calculated flow rate and the operating cycle time interval.

2. The apparatus of claim 1 further comprising means for selectively displaying the calculated flow rate and the total volume.

3. The apparatus of claim 1 further comprising means responsive to said ending signal to send an opening signal to said preselected volume to initiate a second, consecutive metering operation resulting in the calculation of another total volume.

4. The apparatus of claim 3 further comprising means for storing the total volume and for adding that total volume to another total volume upon a repeated operation of said apparatus.

5. The apparatus of claim 3 further comprising inter-cycle time delay means responsive to said ending signal for delaying a second operating cycle of said apparatus, responsive to said ending signal of said first sensor so as to initiate an inter-cycle time delay so as to delay the sending of an opening signal to said valve means until expiration of said inter-cycle time delay.

6. The apparatus of claim 1 further comprising valve delay means for delaying the sending of a closing signal to said valve means upon receiving a signal from said second sensor means indicating that the fluid level has been raised to said upper level, so that said chamber means is filled to a level above said upper level, and so that said evacuation timer means initiates measuring of said second time interval when the level of fluid in said chamber means drops to said upper level.

7. The apparatus of claim 1 further comprising startup means in said computer control means for sending an opening signal to said valve means, and for sending a signal to said operating cycle timer means so as to initiate a first operating cycle timed interval, during which said chamber is filled first to said lower level and then to said upper level so as to initiate a first cycle of said flow meter operation.

8. The apparatus of claim 1 wherein said fluid coupling means comprises T-shaped conduit means having three ports connected to said fluid source, said chamber means and said discharge means, respectively.

9. Apparatus for pumping relatively small metered quantities of fluid from a fluid source over relatively long periods of time, comprising:

a chamber defining a preselected volume between upper and lower fluid levels associated therewith;

a first sensor for sensing the presence of a fluid boundary of a fluid column at the lower level in said chamber and for sending a signal indicative thereof;

a second sensor for sensing the presence of a fluid boundary at the upper level in said chamber and for sending a signal indicative thereof;

a pump downstream of said chamber and having an inlet and an outlet;

remotely actuable valve means upstream of said chamber, between said fluid source and said chamber, said valve means having an outlet and an inlet coupled to the fluid source and further including means for opening and closing the valve in response to signals received from a computer control means;

means coupling the chamber and the pump inlet to the valve outlet;

computer control means coupled to said first and said second sensors and said valve means, for receiving a signal from said first sensor indicating the presence of a fluid boundary at the lower level in said chamber and for sending an opening signal to said valve means in response thereto so as to initiate filling of said chamber above said lower level;

operating cycle timer means responsive to said opening signal and said first sensor signal for measuring an operating time interval beginning at the opening of said valve and ending upon an ending signal from said first sensor responding to a fall of fluid level in said chamber, and said operating cycle timer means including means for sending a signal corresponding to the operating time interval to said computer control means;

said computer control means including means responsive to said second sensor signal indicating the presence of a fluid boundary at the upper level in said chamber so as to issue a closing command to the valve, whereupon fluid in said chamber is evacuated flowing to said pump;

evacuation timer means responsive to said first and said second sensor signals for measuring a time interval for evacuating said chamber during which the fluid level in said chamber falls from said upper level to said lower level, and said evacuation timer means further including means for sending a signal corresponding to the evacuation time interval; and said computer control means including first input means for inputting the preselected volume of the chamber, second input means coupled to the operating cycle timer means for receiving a signal corresponding to the operating cycle time interval, third input means coupled to the evacuation timer means for receiving a signal corresponding to evacuation time interval, means for calculating a flow rate from the preselected volume of the chamber and the evacuation time interval and means for calculating the total volume of the fluid inputted to said pump from the calculated flow rate and the operating cycle time interval.

10. The apparatus of claim 9 further comprising means responsive to said ending signal to send an opening signal to said preselected volume to initiate a second, consecutive metering operation resulting in the calculation of another total volume.

11. The apparatus of claim 10 further comprising means for storing the total volume and for adding that total volume to another total volume upon a repeated operation of said apparatus.

12. The apparatus of claim 10 further comprising inter-cycle time delay means responsive to said ending signal for delaying a second operating cycle of said apparatus, responsive to said ending signal of said first sensor so as to initiate an inter-cycle time delay so as to delay the sending of an opening signal to said valve means until expiration of said inter-cycle time delay.

13. The apparatus of claim 9 further comprising valve delay means for delaying the sending of a closing signal to said valve means upon receiving a signal from said second sensor means indicating that the fluid level has been raised to said upper level, so that said chamber means is filled to a level above said upper level, and so that said evacuation timer means initiates measuring of said second time interval when the level of fluid in said chamber means drops to said upper level.

14. The apparatus of claim 9 wherein said fluid coupling means comprises T-shaped conduit means having three ports connected to said fluid source, said chamber means and said discharge means, respectively.

15. The apparatus of claim 9 further comprising means for selectively displaying the calculated flow rate and the total volume.

* * * * *